Jan. 4, 1966   M. A. LILLETHUN   3,226,903
INSULATED STAINED GLASS WINDOW
Filed Dec. 5, 1963
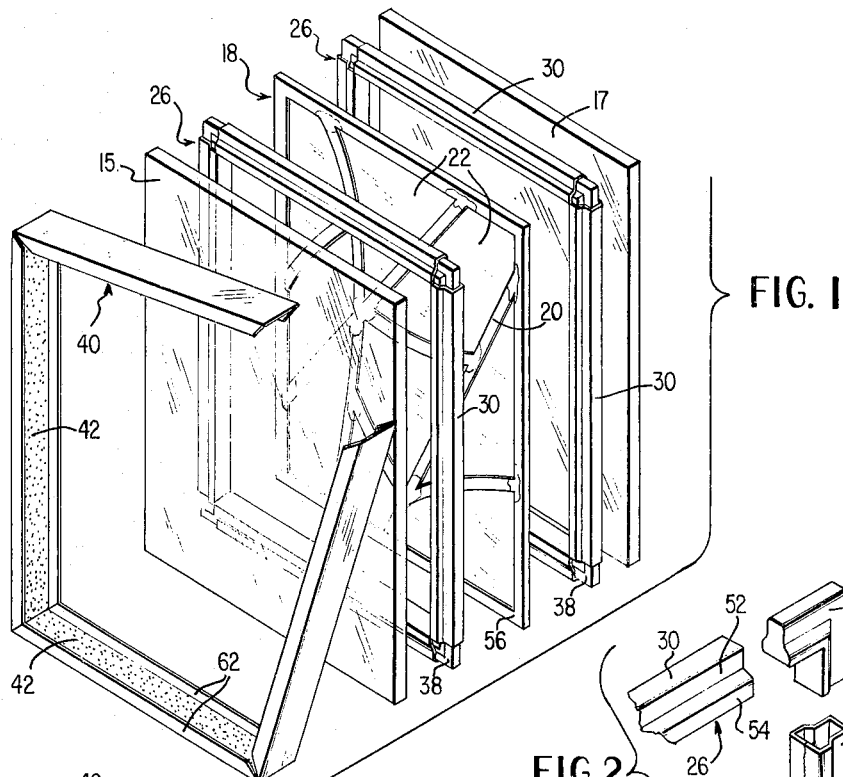
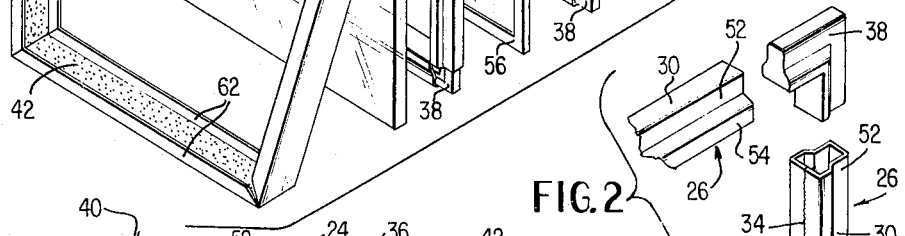
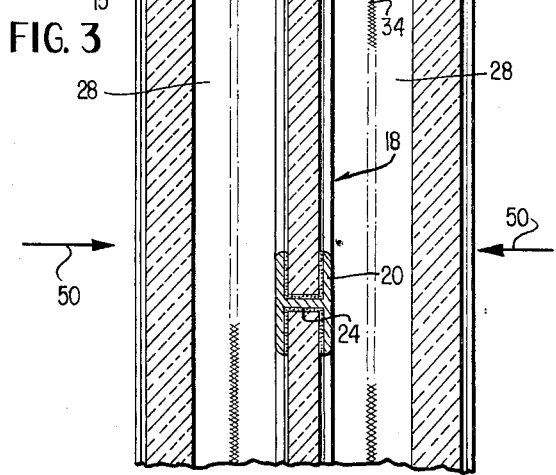
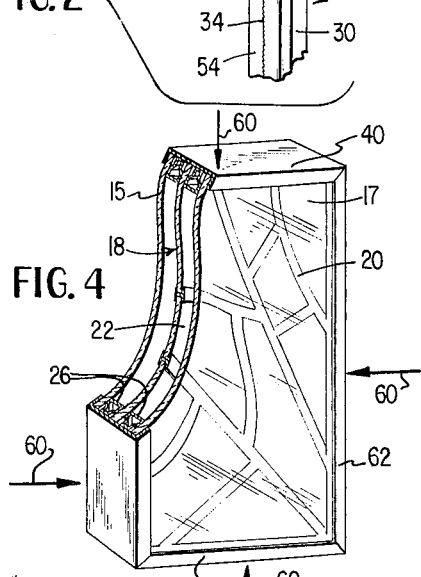
INVENTOR.
MORRIS A. LILLETHUN
BY
*Wynne + Finken*
ATTORNEYS.

United States Patent Office 3,226,903
Patented Jan. 4, 1966

3,226,903
INSULATED STAINED GLASS WINDOW
Morris A. Lillethun, 1221 Bluff St., La Crosse, Wis.
Filed Dec. 5, 1963, Ser. No. 328,342
1 Claim. (Cl. 52—616)

My invention relates to an insulated stained glass unit having a leaded stained glass panel formed from metal cames and colored glass pieces.

My invention provides the method for the manufacture of and the structure which enables the utilization of stained glass windows in today's modern buildings which are designed to provide an air-conditioned and somewhat sound-proof structure. The stained glass units can be easily maintained and economically constructed. It has been recognized over the years that the beauty of stained glass is most desirable in certain buildings but the maintenance problem as well as the heat loss and sound transmission characteristics of such windows have caused architects to look to other means for providing the aesthetic effect inherent in stained glass artistry.

Since stained glass windows are fabricated from metal cames and colored glass pieces, the numerous joints present problems of heat loss, moisture damage, and rattle. The colored glass pieces loosen due to exposure to the elements and are caused to vibrate in their cames by street noises and the like.

My invention provides a stained glass unit wherein a smooth glass pane is combined with a leaded stained glass panel in spaced relation, the spaced relation providing insulation against heat or air conditioning loss, a sound deadening chamber and most important a protector for the expensive stained glass panel. The leaded stained glass panel is protected from the weather; maintenance work, such as cleaning of the window and painting or repair work to the building, may be conducted without concern for the stained glass panel. The problem of foreign matter and dirt collecting on the irregular surfaces of the stained glass panel is eliminated and maintenance is greatly facilitated.

Of equal importance is the distinct effect attained by the use of a multi-glazed window, a stained glass panel making up one of the parts. The outer smooth clear glass highlights the beauty of the inner stained glass and three dimensional effects are possible.

Of critical importance also, with respect to investment and insurance costs, the exterior smooth glass panes provide protection for the artistic and expensive stained glass panel against breakage from wind, hail and other causes.

The method of manufacture involves the assembling of smooth glass panes and a co-extensive intermediate stained glass panel, the positioning of a hydroscopic-type spacer around the two peripheral border spaces between these three elements, the provision of a resilient sealant and bonding material around the entire peripheral outermost edge of the above sub-assembly, this material also extending peripherally inwardly to bond the sub-assembly into a rigid unit, and the provision of a U-shaped channel frame encircling the sub-assembly, the resultant assembly then being clamped into a form of predetermined shape and dimension, and finally curing the composition to hermetically seal and rigidly bond the assembly.

The present invention, both as to its organization and manner of operation together with further objects and advantages thereof, may best be understood by reference to the following description taken in connection with the accompanying drawings in which:

FIG. 1 is a perspective view of the elements of the instant invention in separated unassembled condition;

FIG. 2 is a detail of the method of and structure for joining and plugging the hygroscopic-type spacers;

FIG. 3 is a cross-sectional view showing the elements in final assembled condition; and FIG. 4 is a perspective view of an insulated stained glass unit with a portion broken away to indicate the elements thereof and the final step of assembly.

Referring now to FIGS. 1 and 3, it will be seen that the elements of my stained glass unit comprise a pair of spaced outer smooth glass panes 15 and 17 and a coextensive intermediate leaded stained glass panel 18, this panel 18 being fabricated from a predetermined arrangement of metal internal cames 20 and colored glass pieces 22, a caulking means 24 (FIG. 3) being positioned between each glass piece 22 and its respective cames 20 to seal and fix the piece in the came. It will be noted in FIG. 3 that the cames 20 produce an irregular surface and it will be understood, also, that the colored glass pieces 22 may have irregular surfaces.

Sandwiched between each glass pane 15 and 17 and panel 18 is a spacer 26 which extends along the entire opposed peripheral borders thereof forming an air chamber 28 therebetween. The spacers 26 and 26 are preferably formed of hollow aluminium tubes 30, these tubes having been manufactured by a rolling process which leaves a minute slit 32 at their inner faces.

As seen in FIGURE 2, preferably the edges 34 of the tubes are slightly serrated to form a grate-like structure for retaining a hygroscopic material 36 which is in the form of a course sand, the material being silica gel. As seen in FIGURE 2, the aluminium tubes 30 are formed into hygroscopic-type spacers 26 by the use of solid right angle plug adapters 38 inserted into the ends of the tubes after the tubes have been filled with the course sand-like silica gel 36. These spacers 26 are then maintained in dry heated condition to inhibit the absorption of moisture by the silica gel.

U-shaped channel frame 40 is provided for encircling the elements of the sub-assembly discussed above, this being preferably an aluminum channel frame which aids in rigidifying and supporting the elements. It will be noted in FIG. 1 that the channel frame 40 is fabricated to the desired shape and length with mitres cut to enable bending at predetermined locations and forming the desired corners.

As seen in FIG. 3 and as indicated by arrows 50–50, the sub-assembly of two glass panes 15 and 17, the stained glass panel 18 and the two spacers 26 and 26 are clamped toward each other and held in this position while the channel frame 40 is wrapped therearound, a resilient sealant and bonding composition 42 in the form of a ribbon of predetermined width and depth extending over the outer edge periphery of the sub-assembly and extending between the elements thereof. As seen in FIG. 4, the channel frame 40 is then clamped in position as indicated by four arrows identified by numeral 60 to form the final assembly into the desired shape and size. These steps of the method are followed by a curing of the composition 42 to produce a resiliently and soundly integrated final assembly having two sealed moisture-proof chambers 28 and 28.

It will be noted in FIGS. 2 and 3 that the spacers 26 and 26 shown in transverse cross section each have a wide bulbous inner base 54 having substantially flat side faces parallel to its respective glass pane and the peripheral metal came of the panel with a narrow dome-like outer portion 52 which terminates substantially at the peripheral border or edge of the glass panes. This configuration in combination with the planar surface of the glass panes 15 and 17 and the peripheral molding came 56 which encircles the stained glass panel 18 provides composition receiving cavities of irregular shape which facilitate the flow of the composition upon application of the composition 42 and the channel frame 40. It will be noted that the composition 42 flows inwardly between the elements of the sub-assembly thereby providing a moisture-proof seal, and also that the composition 42 contacts and bonds itself to the aluminum channel frame 40. The combination of the composition and the channel frame provides a sound supporting framework for the elements of the sub-combination, it being noted that the legs 62 and 62 of the U-shaped channel frame 40 extend peripherally inwardly adjacent the outward peripheral borders of the panes 15 and 17. The composition 42 is preferably a polysulphide.

Where the exterior exposure is such that a glare problem exists, a special type of smooth glass pane may be used which is engineered to absorb glare and a certain amount of solar heat.

Preferably, the composition 42 is deposited as a ribbon of predetermined thickness within the confines of legs 62 and 62 of the frame 40 and around the entire inner surface of the frame after which the frame is clamped on the sub-assembly formed by the glass pane-spacer-stained glass panel-spacer-glass pane. The frame 40 confines the composition 42 and extrudes it into the spaces between the elements of the sub-combination and itself. It will be understood that the ribbon of composition 42 could also be applied around the peripheral edge surface of the subassembly prior to application of the frame 40.

While my invention has been described above in conjunction with specific apparatus, this has been by way of example only and is not to be considered as a limitation to the scope of this invention.

I claim:

An insulated stained glass unit comprising a pair of spaced outer smooth glass panes and a coextensive intermediate leaded stained glass panel positioned in spaced relationship therebetween, said leaded glass panel having a peripheral metal came and internally metal cames and colored glass pieces, each internal came extending outwardly of and over the peripheral border of its respective colored glass pieces, said cames uniting the colored glass pieces into a panel of predetermined design, caulking means positioned between each glass piece and its respective cames, a spacer sandwiched between and extending along each of the two entire outer opposed peripheral borders of said panel and said panes to form two chambers, each spacer having a wide bulbous inner base with substantially flat side faces parallel to its respective glass pane and said peripheral metal came and a narrow dome-like outer portion terminating substantially at the peripheral border of said glass panes, each spacer containing hygroscopic material and having means for establishing fluid communication between said hygroscopic material and its respective chamber to inhibit the existence of moisture in said chambers, each spacer being made up of a series of tube sections strung together with solid right angle plug adapters inserted into the ends of the tube sections, a resilient sealant and bonding composition extending over the outer edge peripheries of the panes, spacers and panel and extending between each pane and its respective spacer and between each spacer and the panel, and a U-shaped channel frame peripherally surrounding the panes, spacers and panel with the legs of the channel frame extending peripherally inwardly adjacent the outer peripheral borders of the panes, said U-shaped channel frame, spacers, panes and panel forming peripheral cavities of irregular shape and being peripherally bonded into an integral unit by said composition, said resilient sealant and bonding composition being of a predetermined quantity to completely fill said cavities with a controlled excess for extension as thin films inwardly between said legs of said channel frame and said panes and between the side faces of said spacers and the panes and panel.

References Cited by the Examiner

UNITED STATES PATENTS

| | | | |
|---|---|---|---|
| 1,792,550 | 2/1931 | Pettit | 20—56.5 |
| 1,988,964 | 1/1935 | Barrows | 161—45 |
| 2,173,649 | 9/1939 | Firner | 20—56.5 |
| 2,327,974 | 8/1943 | Woelfel | 20—56.5 |
| 2,691,294 | 10/1954 | Corneil | 20—56.5 X |
| 2,838,809 | 6/1958 | Zeolla et al. | 20—56.5 |
| 2,877,516 | 3/1959 | Bobel | 20—56.5 |
| 2,933,780 | 4/1960 | Shinefeld | 20—56.5 |
| 2,964,809 | 12/1960 | Gwyn et al. | 20—56.5 |
| 2,991,213 | 7/1961 | Williams | 189—77 X |
| 3,030,673 | 4/1962 | London | 20—56.5 |
| 3,105,274 | 10/1963 | Armstrong | 20—56.5 |

HARRISON R. MOSELEY, *Primary Examiner.*

REINALDO P. MACHADO, *Examiner.*

W. E. HEATON, *Assistant Examiner.*